(12) United States Patent
Hubbell, Jr. et al.

(10) Patent No.: US 6,758,928 B2
(45) Date of Patent: Jul. 6, 2004

(54) METHOD OF FORMING PNEUMATIC RADIAL TIRE INCLUDING TREAD HAVING ASYMMETRIC PROFILE

(75) Inventors: David Ray Hubbell, Jr., Hartville, OH (US); Christopher Michael Smith, Akron, OH (US); Michael David Kachner, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 151 days.

(21) Appl. No.: 10/044,404

(22) Filed: Jan. 11, 2002

(65) Prior Publication Data

US 2003/0155057 A1 Aug. 21, 2003

(51) Int. Cl.[7] ............................. B29D 30/00; B60C 3/06; B60C 11/00
(52) U.S. Cl. ............................. 156/110.1; 152/209.14; 152/456; 703/1; 703/2
(58) Field of Search ..................... 152/209.8, 209.14, 152/455, 456; 156/110.1; 703/1, 2

(56) References Cited

U.S. PATENT DOCUMENTS

| | | | |
|---|---|---|---|
| 3,155,135 A | 11/1964 | Klenk .......................... | 152/353 |
| 3,435,874 A | 4/1969 | Mirtain et al. ............... | 152/352 |
| 3,765,468 A | 10/1973 | Vendier ....................... | 152/352 |
| 3,980,118 A | 9/1976 | Kinas ...................... | 152/209 R |
| 4,763,708 A | 8/1988 | Takahashi et al. .......... | 152/209 |
| 4,830,077 A | 5/1989 | Goto et al. .................. | 152/209 |
| 4,840,210 A | 6/1989 | Kukimoto .................... | 152/209 |
| 4,848,429 A | 7/1989 | Mezzanotte .................. | 152/209 |
| 4,877,072 A | 10/1989 | Fontaine ...................... | 152/209 |
| 4,905,748 A | 3/1990 | Kukimoto et al. ...... | 152/209 R |
| 5,205,978 A | 4/1993 | Ushikubo et al. | |
| 5,301,728 A | 4/1994 | Brown, Jr. et al. ...... | 152/209 R |
| 5,591,282 A | 1/1997 | Weber et al. ............... | 152/456 |
| 5,620,538 A | 4/1997 | Oshima ....................... | 152/209 |
| 5,735,979 A | 4/1998 | Secondari ............... | 152/209 A |
| 5,971,048 A | 10/1999 | Ashmore et al. ..... | 152/209 RR |
| 6,142,201 A | * 11/2000 | Harms ..................... | 152/209.8 |

FOREIGN PATENT DOCUMENTS

| | | | |
|---|---|---|---|
| CA | 810955 | 4/1969 | ................... 152/89 |
| EP | 0755808 | 1/1997 | ............. B60C/3/06 |
| EP | 820884 | 1/1998 | ........... B60C/11/01 |
| GB | 2205283 | 4/1988 | ............. B60C/3/06 |
| JP | 61282102 | 12/1986 | ............. B60C/3/06 |

\* cited by examiner

Primary Examiner—Steven D. Maki
(74) Attorney, Agent, or Firm—Nancy T. Krawczyk; David E. Wheeler

(57) ABSTRACT

By shifting the peak height of the tread on one side of the tire from the centerline (CL), for a tire intended for cambered use on a vehicle and/or exposure to lateral loading, improvements in the footprint shape, pressure distribution, area and footprint shape factor (FSF) are obtained. In an illustrated embodiment, 0.127 cm to 5 cm (deep) of mold material are removed from one side of the centerline (CL) of the crown in a conventional mold, at 15% to 85% of the distance from the centerline to the shoulder area of the mold (one-half inch to five and one-half inches in the illustrated tires), to obtain a mold shape having the designated change in tread peak height.

4 Claims, 5 Drawing Sheets

METHOD OF FORMING PNEUMATIC RADIAL TIRE INCLUDING TREAD HAVING ASYMMETRIC PROFILE

FIELD OF THE INVENTION

The invention relates to an improved pneumatic tire, especially as it pertains to traction, handling, wear and durability of a pneumatic tire.

BACKGROUND OF THE INVENTION

A pneumatic tire provides cushioning between a vehicle and a driving surface, and a pneumatic tire and its construction have an influence on the handling properties of the vehicle. Since a pneumatic tire can be designed to optimize traction, the tire can have a strong influence on the acceleration of the vehicle. Other performance properties of the vehicle are also integrally related to the properties of the pneumatic tires which are mounted on the vehicle.

Tires are sometimes designed to have specific properties which are tuned to the kind of use that is to be made of a vehicle. For example, if a vehicle is used mainly for straight ahead driving, the pneumatic tire can be constructed to maximize the tread contact of the tire when the tire is going straight ahead. Similarly, when frequent cornering is expected, such as is encountered by race cars going counterclockwise around oval tracks, the tires are sometimes constructed to stiffen the right sidewall to maximize the tread contact between the tire and the riding surface when the vehicle is cornering. Often, these specialized constructions sacrifice one property in exchange for maximizing another property.

When a tire is constructed to provide maximum tread contact with the riding surface for the kind of use most often encountered by the vehicle, the durability of the tire usually increases. When, for example, vehicle tires are especially constructed for race cars running on an oval track so that tread contact is maximized during cornering, it is expected that the number of tire changes during a race may be reduced.

When a vehicle is expected to encounter right-hand turns as well as left-hand turns, logic would indicate that the proper construction for such a tire would be the same or similar construction to that used on a vehicle that encounters a lot of straight ahead driving.

DEFINITIONS

"Aspect ratio" of the tire means the ratio of its section height (SH) to its section width (SW) multiplied by 100% for expression as a percentage.

"Axial" and "axially" mean lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt reinforcing structure" means at least two layers of plies of parallel cords, woven or unwoven, underlying the tread, unanchored to the bead, and having both left and right cord angles in the range from 17 degrees to 27 degrees with respect to the equatorial plane of the tire.

"Circumferential" means lines or directions extending along the perimeter of the surface of the annular tread perpendicular to the axial direction.

"Equatorial plane (EP)" means the plane perpendicular to the tire's axis of rotation and passing through the center of its tread.

"Footprint" means the contact patch or area of contact of the tire tread with a flat surface at zero speed and under normal load and pressure.

"Inboard side" means the side of the tire nearest the vehicle when the tire is mounted on a wheel and the wheel is mounted on the vehicle.

"Outboard side" means the side of the tire farthest away from the vehicle when the tire is mounted on a wheel and the wheel is mounted on the vehicle.

"Ply" means a continuous layer of rubber-coated parallel cords.

"Pneumatic tire" means a laminated mechanical device of generally toroidal shape (usually an open torus) having beads and a tread and made of rubber, chemicals, fabric and steel or other materials. When mounted on the wheel of a motor vehicle, the tire, through its tread, provides traction and contains the fluid or gaseous matter, usually air, that sustains the vehicle load.

"Radial" and "radially" means directions radially toward or away from the axis of rotation of the tire.

"Section height" (SH) means the radial distance from the nominal rim diameter to the outer diameter of the tire at its equatorial plane.

"Shoulder" means the upper portion of a sidewall just below the tread edge.

"Sidewall" means that portion of a tire between the tread and the bead.

"Tread" means a molded rubber component which, when bonded to a tire casing, includes that portion of the tire which comes into contact with the road when the tire is normally inflated and under normal load.

"Unit tread pressure" means the radial load borne per unit area (square centimeter or square inch) of the tread surface when that area is in the footprint of the normally inflated and normally loaded tire.

SUMMARY OF THE INVENTION

A pneumatic tire has at least a pair of parallel annular beads or bead-like structures in association with a carcass ply, belt or breaker reinforcement disposed over a crown area of the carcass ply, a tread disposed over the belts or breakers, and sidewalls disposed between the tread and the beads or bead-like structures. The tire of the invention has an asymmetric profile wherein the highest point in the tread is located between the centerline of the tread and the shoulder of the tread at 15% to 85% of the distance from the centerline to the shoulder of the tread.

In an illustrated tire, the highest point in the tread is 3 inches (7.62 cm) from the centerline (CL).

For various tire constructions embraced by the invention, the tread at its highest point may be 0.127 cm to 5 cm higher than the tread at a corresponding point on an opposed side of said centerline (CL).

In an illustrated tire, the highest point in the tread is 0.127 to 1.27 (cm) higher than a corresponding point in a tread half on the opposite side of the centerline (CL).

The pneumatic tire may be defined by an asymmetric profile wherein a peak (P) in the tread has a height and location defined by the formulae $P=(\sin C \cdot W)-(N/K)$ and $L=\frac{1}{2}W-(0.3P/\sin C)$, where L is the distance of Peak shift from the centerline P is the maximum differential in mold geometry from side to side K is tire vertical spring rate S is sidewall length W is tread width C is the average dynamic camber, and N is the normal load It is an object of the invention to provide a tire construction that provides good contact between the tread and the riding surface when a vehicle on which it is mounted is cornering, without sacrificing tread contact and handling properties when the vehicle is driven straight ahead.

Other objects of the invention will be apparent from the following description and claims.

BRIEF DESCRIPTION OF THE DRAWINGS

The invention will be described by way of example and with reference to the accompanying drawings in which:

FIG. 1A is a view of the cross-section of FIG. 1 folded upon itself along CL.

DETAILED DESCRIPTION OF THE INVENTION

In the conception of the invention, it was realized that a tire mold that is designed symmetrically has evolved to adjust the pressure distribution and the shape of the tire footprint for the tire shoulder that will see primary loading during use. As a result, a cambered footprint can be "D" shaped while the vehicle is running straight ahead, causing heat buildup in the cambered shoulder (the inboard side of the tire), while providing very little contact in the outside shoulder (see FIG. 3).

Figure 2:
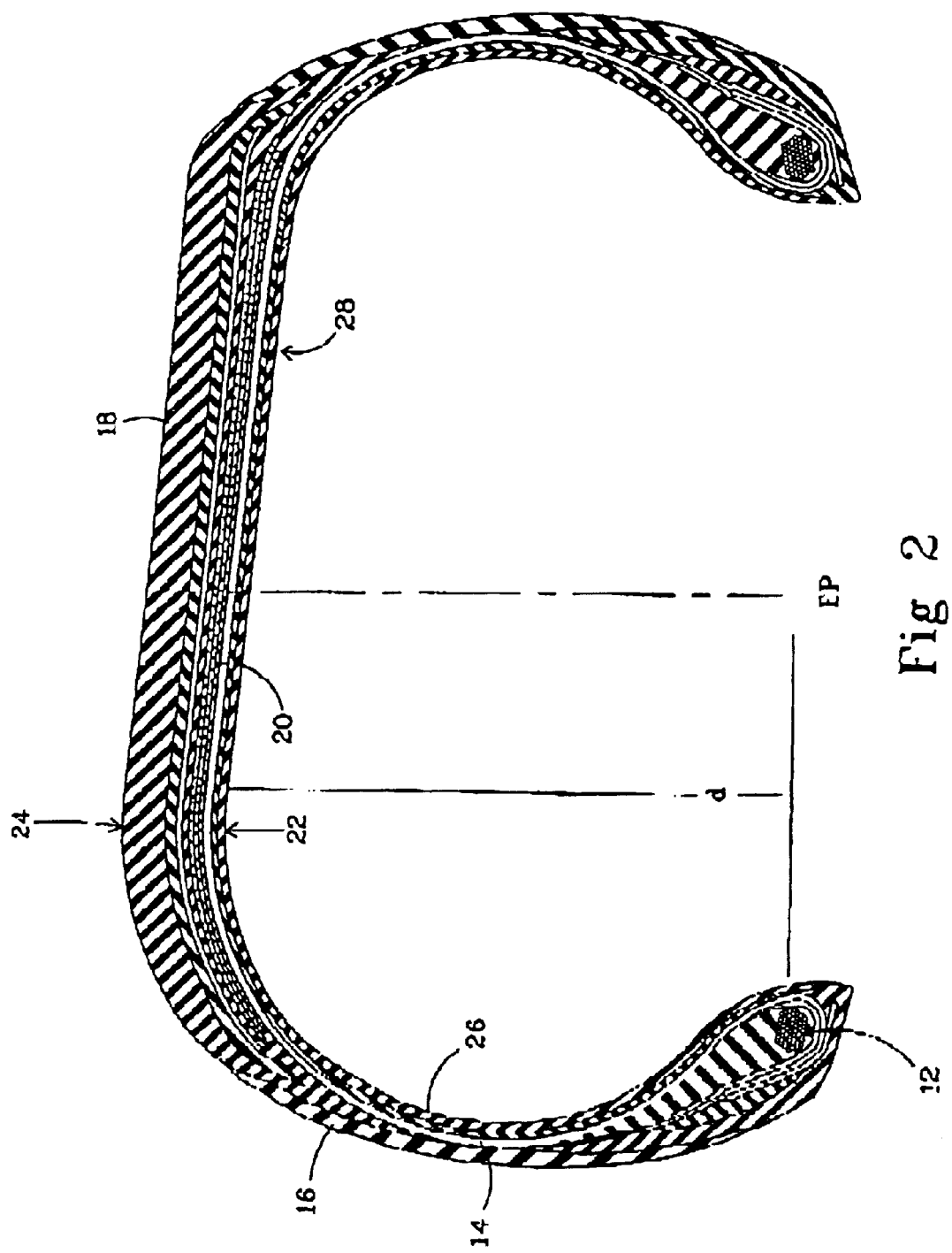
FIG. 2 is a cross-section of a tire made according to the invention.

Although the invention can be used in a broad spectrum of tires, the tire illustrated in FIG. 2 is representative of the invention.

Tire 10 may have at least a pair of annular bead cores, or some substitute structure in a bead area 12 of the tire, a carcass ply 14 disposed between the bead cores or substitute structure, crown belt or breaker reinforcement 20 disposed over a crown portion of carcass ply 14, tread 18 disposed over the crown reinforcement, and sidewalls 16 disposed between the tread and the bead area. Because of the change in the profile of the mold, the distance "d" from the bead to the high point 22 on the surface of inner liner 26 is 0.38 inch and 0.22 inch longer, in the illustrated tires, than a similarly positioned point 28 of the tire located on the opposite side of the equatorial plane (EP).

The height and the location of the peak in a particular tire depends on the tire size, the stiffness of the sidewall, the aspect ratio, the design load of the tire, and the dynamic camber of the tire in use. It is expected that the peak height may be between 0.127 cm and 5 cm, and the location of the peak may be between the centerline (CL) and the shoulder of the tire at 15% to 85% of the distance from the centerline (CL) of the tread to the shoulder.

Although the ranges given above are intended to describe the invention for all tires that may use the invention, more specific ranges may be provided for different kinds of tires. For example, a tire profile change of "d" in a passenger tire may be 0.127 cm to 1.27 cm, and the profile change of "d" of 0.32 cm to 2.54 cm may be employed in light truck tires. Similarly, a 0.64 cm to 3.8 cm change may be used in medium truck tires and a change of 1.27 to 5 cm may be used in heavy truck tires and large off-the-road tires.

The change in profile for a particular tire may be defined by the formulae $L=\frac{1}{2}W-(0.3P/\sin C)$ and $P=(\sin C \cdot W)-(N/K)$. It should be noted, however, that the formulae appear to be applicable to radial tires only, since application to bias tires yields apparently erroneous results. It is believed that the general concept of the invention still works for bias tires, but until a bias related formulae is established, other means, such as trial and error, must be used to establish the peak height and locations in bias tires. It is theorized that a pivot point in the shoulder of a radial tire, which is the flex point between the tread and the sidewall of the tire, a feature that bias tires do not have, may account for the difference in results.

In the table below, the data is provided for the illustrated tires. Although not all the information provided is used in the formulae, the information is believed to help illustrate the invention.

|  |  | Experimental Front | Experimental Rear |
|---|---|---|---|
| L = | Location of Geometry shift from the true tire centerline | 3.55 inches (8.9 cm) (actual) | 4.20 inches (10.7 cm) (actual) |
| P = | Peak of the geometry shift (comparing Delta of left and right) | 0.41 inch (1 cm) (actual) | 0.22 inch (.48 cm) (actual) |
| K = | dynamic vertical spring rate | 3000 lbs/in | 1550 lbs/in |
| S = | Sidewall length (above the rim flange) | 3.2 in | 4.1 in (10 cm) |
| W = | width of the tread | 11.8 in | 12.0 in |
| C = | average dynamic camber | 3.0 deg | 3.0 deg |
|  | Sine of the dynamic camber | 0.05 | 0.05 |
| N = | normal load | 600 lbs | 550 lbs |
| L(calc) |  | 3.51 | 4.43 |
| P(calc) |  | 0.42 | 0.27 |

The average dynamic camber is the camber most encountered by the tire in use on the vehicle.

The last two columns in the table illustrate numbers used in illustrated calculations, using data from the named tires and vehicle.

The location of the peak 22, that is its distance from the centerline (CL) of the tread, is calculated to be $L=\frac{1}{2}W-(0.3P/\sin C)$.

| Calculated values | | Front | Rear |
|---|---|---|---|
| L = | ½ W − (.3P/sinC). | 3.51 inches | 4.43 inches |

And for this example, where P defines the change in height of the tread profile, P has the following value.

| | | Front | Rear |
|---|---|---|---|
| P = (sinC · W) − (N/K) | D deg (3000 lbs/in) .052/1350 lbs | .42 inch | .27 inch |

One of the biggest factors in a tire's vertical spring rate is its size. The aspect ratio of the tire also plays an important role in how it behaves on a cambered vehicle.

The size of the peak may be provided in a range by assuming a camber of 0.25 deg. to 5 deg. For a specific vehicle and tire, the camber may be optimized for its intended use.

Race cars, for example, are highly cambered, and may have a static camber of 3° on the front tires and 2° on the rear tires. While cornering, the dynamic camber may increase 3° or more due to the weight of the car and the car suspension.

The inventors theorized that an asymmetric mold shape could be used to offset some of the forces encountered by a cambered tire, especially during cornering.

In the concept of the invention, the object was to move the geometric "center" of the tire towards the off camber shoulder (outside shoulder), on the premise that this would allow the contact patch to be loaded from the camber shoulder past the actual centerline of the tire. With more of the tire handling the load, the curvature of the inboard loaded tread radii could potentially be reduced, potentially reducing internal stresses.

The theory behind using an asymmetric mold shape is that more even loading will provide more tread area in contact with the road surface that will result in the following:

1. An increase in area of the tread contact patch.
2. A decrease in peak contact pressure.
3. A uniform operating tread temperature profile.

Each of the characteristics listed above will result in a decrease in the amount of energy that any specific point in the tread sees, i.e. a reduced unit tread pressure is obtained, which in turn should increase the tread life.

Figure 1:
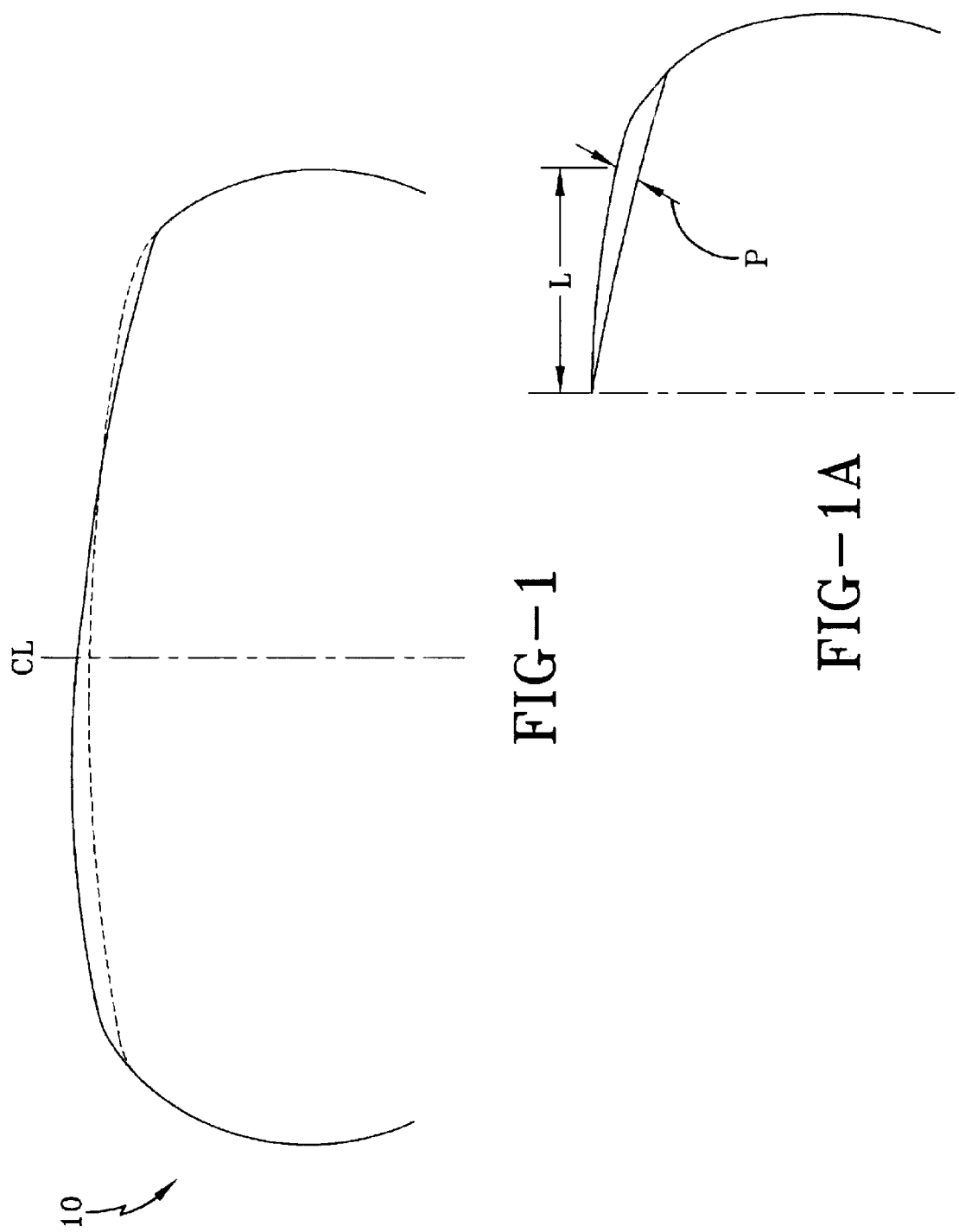
FIG. 1 is a cross-section profile of a tire of the invention.

Six mold shape iterations were used (21A–26A) to evaluate mold shapes that possess a footprint with the desirable performance characteristics (see FIG. 1). Mold contours were evaluated with the peak section height shifted from one inch to three inches from the centerline, which caused a change in the shoulder geometry. The sidewall shape of the tire was maintained in the mold.

In tires made using the mold shapes tested, it was found that:

1) The 26A tire having an asymmetric mold shape produced a 16% reduction in peak shoulder pressure. Other improvements in footprint characteristics included increased area, width, and a shape that is more square under 3 degrees camber (Table 1).
2) The rolling analyses demonstrated, surprisingly, similar improvements in footprint properties in terms of contact pressure and shape for both positive slip angles (left hand turn) and negative slip angles (right hand turn) (Table 2).
3) The asymmetric mold shapes allow for increased loading of the "off-camber" and centerline rubber which should enable increases in both footprint efficiency and performance.
4) Combined Drive and Lateral traction are both better for the asymmetric design.
5) Track testing showed a significant improvement in stability, temperature/wear profile and lap time performance.

To test the theory of the invention, conventional tire molds were modified by removing an additional volume of mold material to place the peak height of the mold at a chosen location from 1 inch (2.54 cm) to 3 inches (7.62 cm) from the centerline of the mold (it being understood that the centerline of the mold corresponds to the centerline of the tire made therein). The removal of material was done in a gradient over a substantial portion of the mold so that the mold shape remained smooth. In the tires evaluated, 0 to 0.19 inch (0 to 0.48 cm) of material was removed in the various locations.

It is believed that larger or smaller displacements of the peak height from the centerline (CL) can be used, for example 0.127 cm to 5 cm for acceptable results in specific applications.

With reference to FIGS. 1 and 1A, a profile of a tire made in a modified mold is illustrated with the original profile of the tire shown in dashed lines. Because of internal stresses in the tire construction, the tread of the modified tire shifts such that the tread is shown higher than the dashed line on one side of the centerline (CL) of the tire, and is below the dashed line on the opposed side of the centerline. Because of this shift, it is difficult to define P in terms of the mold modifications, and it has been found convenient to define P in terms of the difference seen between the tread height on each side of the tire when the tire profile, with the shift, is folded over upon itself as illustrated if FIG. 1A. Thus L is the location of the point of maximum difference P in tread height between the two tread halves when they are superimposed upon one another, and P is the maximum difference at the determined location L.

When a tire is cured in a mold, the high pressure and high heat in the curing process forces rubber flow and forces the tire being molded to accept the contour of the mold, and the belt package as well as the tread rubber of the tire is forced into a shape which is dictated by the shape of the mold. In a tire made using such a modified mold, using the beads as a reference, the height of the tread rubber above the beads and the height of the belt above the beads can be measured. The tires tested were constructed as is otherwise conventional in the art for this type of tire.

In most tire constructions the change in dimensions of the tire will correspond somewhat with the change in dimensions of the mold. In constructions using relatively soft tread rubber and/or springy belt reinforcement constructions, the changed peak height and location may differ a greater amount. It is believed that the ranges provided herein embrace the possible variations.

Figure 3:
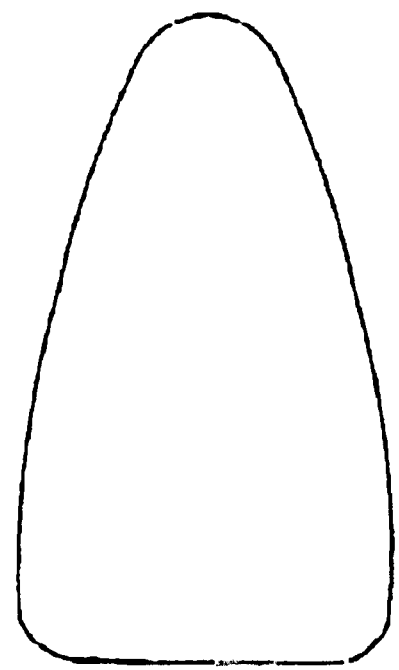
FIG. 3 is a dynamic footprint of a prior art tire made on a cambered wheel while the vehicle is going straight ahead.

With reference now to FIG. 3, an illustration of a smooth tread racing tire mounted on a cambered vehicle (in this case a Corvette), shows a D-shaped footprint that is obtained when the vehicle is moving straight ahead.

Figure 4:
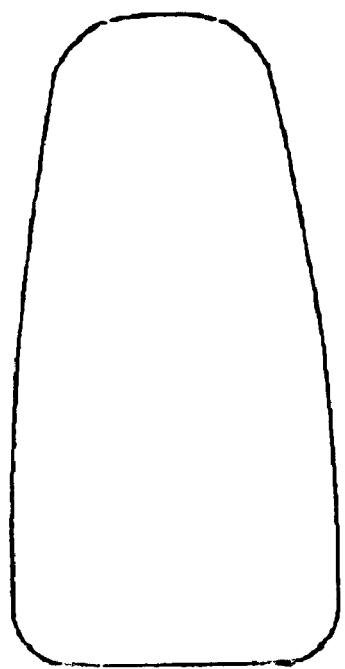
FIG. 4 is a dynamic footprint of a tire of the invention on a cambered wheel while the vehicle is going straight ahead.

With reference to FIG. 4, when the tire is modified as described in the invention, having an increased peak tread height on the one-half tire which is mounted to be outboard of the vehicle, the D-shaped nature of the footprint is substantially reduced. Such a shape modification causes a more even distribution of contact between the tire tread and the road surface, a more even pressure distribution between the tire and the road surface, and a lower average pressure distribution (because the footprint is larger).

Surprisingly, it has been found that using the mold shape of the invention, a tire of the invention has an improved contact area when the vehicle is moving straight ahead, as well as a substantially improved contact area when the vehicle encounters both right-hand turns and left-hand turns.

Table 1 describes footprint data for six experimental mold shapes evaluated. Based on the data, it was decided to test the inventive concept, given the specified conditions, using the mold shape specified as 26A. In mold shape 26A, the peak tread height was displaced three inches from the centerline (CL) of the tire, and the tread height was increased 0.22 inch (0.56 cm) in the outboard half of the tire. The experimental tire was a rear tire.

Those skilled in the art will recognize that if different conditions are specified, another mold shape may provide more optimal properties.

The control tire used in this example was the rear tire for the Corvette C5-R

The invention is further illustrated with reference to the following examples.

EXAMPLE 1

The objective of this example was to develop a new rear tire design utilizing an asymmetric mold geometry in order to maximize tire performance through improved footprint efficiency.

The control tire used in this example was the rear tire for the Corvette C5-R, which competes in the American LeMans Series (ALMS) and Grand American Road Racing Association Events. The mold designs that were evaluated contained an asymmetric tread contour where the peak section height was shifted from the centerline in the range of 1.0 to 3.0 inches (2.54 to 7.62 cm). The object of this shift was to test the concept that the footprint shape and pressure distribution during cornering could be improved, to allow the footprint to be less "D" shaped while running straight ahead. It was found that the asymmetric designed mold produces a tire that has a more symmetric working footprint under cambered conditions. The asymmetric design selected provided a 4% increase in dynamic footprint area, an improved dynamic footprint shape factor, and better simulated combined traction Force & Moment. Track testing

TABLE 1

Static Footprint Data Comparison

| Mold Shape | Contact Pressure Peak | Contact Pressure Avg. | SH Length Inside | SH Length Outside | SH Length CL | Width (in.) | FSF | Area (in.) |
|---|---|---|---|---|---|---|---|---|
| Control | 108.800 | 29.700 | 5.680 | 3.260 | 3.260 | 10.32 | 1.06 | 43.920 |
| 21A | 126.900 | 29.400 | 4.960 | 2.950 | 4.890 | 10.35 | 1.24 | 44.850 |
| 22A | 103.100 | 28.800 | 5.070 | 2.980 | 4.770 | 10.47 | 1.19 | 45.550 |
| 23A | 86.800 | 29.000 | 5.100 | 3.100 | 4.720 | 10.5 | 1.16 | 45.390 |
| 24A | 90.000 | 28.700 | 5.110 | 3.030 | 4.750 | 10.53 | 1.17 | 45.630 |
| 25A | 92.200 | 29.000 | 5.190 | 3.430 | 4.660 | 10.41 | 1.08 | 45.360 |
| 26A | 91.800 | 28.900 | 5.150 | 3.400 | 4.620 | 10.65 | 1.08 | 45.450 |

Table 2 provides dynamic data for tires undergoing left-hand and right-hand turns. The data shows that tires 26A showed reduced peak contact pressure, as compared to the control, as well as an increased footprint area and width in both the right-hand and left-hand turns.

By "reduced peak pressure" it is meant that the maximum pressure at any point in the footprint is reduced. This is indicative of improved pressure distribution in the footprint.

Figure 6:
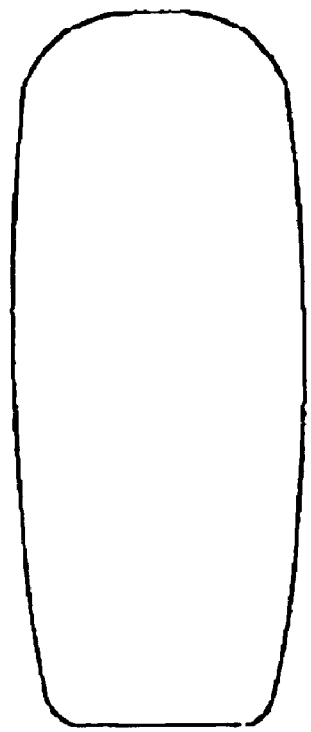
FIG. 6 is a dynamic footprint of a tire of the invention made while the vehicle on which it is mounted undergoes cornering in a left hand turn.
Figure 5:
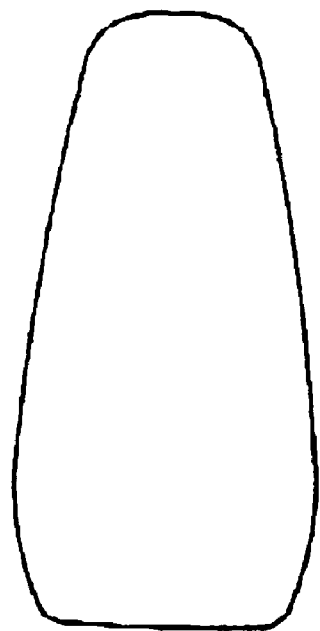
FIG. 5 is a dynamic footprint of a prior art tire made when the vehicle on which it is mounted undergoes cornering in a left hand turn.
Figure 8:
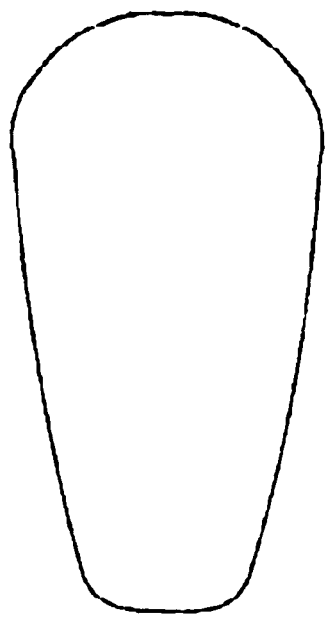
FIG. 8 is a dynamic footprint of a tire of the invention made while the vehicle on which it is mounted undergoes cornering in a right hand turn.
Figure 7:
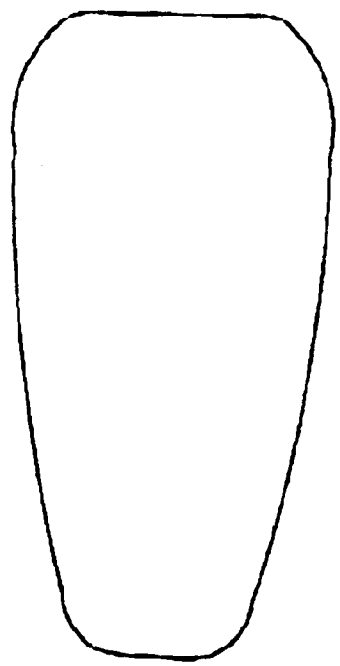
FIG. 7 is a dynamic footprint of a prior art tire made during cornering of the vehicle on which it is mounted undergoes cornering in a right hand turn.

Dynamic footprints of a control tire and the tire of the invention, respectively, in a left-hand turn are shown in FIGS. 5 and 6. Dynamic footprints of a control tire and a tire of the invention, respectively, in a right-hand turn are shown in FIGS. 7 and 8.

TABLE 2

Rolling Footprint Data Comparison (5% Drive)

Left Hand Turn

| Mold Shape | Contact Pressure Peak | Contact Pressure Avg. | SH Length Inside | SH Length Outside | SH Length CL | Width (in.) | FSF | Area (in.) |
|---|---|---|---|---|---|---|---|---|
| Control | 70.200 | 28.300 | 4.980 | 2.970 | 4.680 | 10.83 | 1.18 | 46.290 |
| 26A | 68.900 | 27.700 | 3.640 | 4.520 | 4.620 | 11.19 | 1.13 | 48.170 |

Right Hand Turn

| Mold Shape | Contact Pressure Peak | Contact Pressure Avg. | SH Length Inside | SH Length Outside | SH Length CL | Width (in.) | FSF | Area (in.) |
|---|---|---|---|---|---|---|---|---|
| Control | 61.400 | 28.300 | 3.020 | 5.020 | 4.650 | 10.77 | 1.16 | 46.070 |
| 26A | 54.100 | 27.700 | 3.160 | 5.140 | 4.970 | 10.86 | 1.20 | 47.820 | found the tires to show an improvement in overall stability (especially on cold tires), better lateral traction, slightly better forward traction, improved lap time by 0.8 seconds and improved wear and temperature profiles.

Six mold iterations were evaluated for footprint shape and pressure distribution.

The purpose of the asymmetry is to allow independent tuning of each portion of the footprint. Typically, mold geometry tuning is done on the most severely loaded shoulder, which tends to make the rest of the footprint very inefficient in contacting the surface while running.

The mold shape 26A provided the best footprint characteristics and simulated Force and Moment data for the Longitudinal and Lateral planes.

Tires were evaluated at Sears Point Raceway. New rear tires made with the asymmetric mold shape feature provided increased grip and stability.

In view of the surprising improvement of footprint shape and contact pressure for both straight ahead use and cornering, it is believed that the invention, although illustrated on a race track, will have broad application for tires made for automobiles for street use.

The 26A mold shape produced a desirable footprint in both static and dynamic conditions. Tables 1 and 2 provide a summary of the footprint parameters. A track evaluation showed improvements in both lateral stability and "power down". "Power down" refers to the ability to apply the throttle under cornering.

With reference to Table 1, with an object to provide more even pressure distribution across the width of a tire, the peak contact pressure (highest pressure point in the tire) should be reduced while the average contact pressure remains relatively constant.

The "SH length" in the Table refers to the shoulder length at 90% of the width from the center line (CL) of the tread.

The mold shape that produced the most even pressure distribution also produced the widest tire footprint among those tested. The footprint shape factor (FSF) also tended to be closer to 1.0, indicating a more square footprint. The size of the footprint, i.e. the area in square inches, also increased over the average footprint area of prior art tires.

The control tire and experimental tire 26A were made with the same diameter and the same width, and were placed on the same size rims. When all parameters and conditions were the same, the respective footprints, obtained in left hand turns and right-hand turns, had the following properties:

TABLE 3

Footprint Comparison (Left Hand Turn)
Dimensions/Ratio

| CONTROL | | | | |
|---|---|---|---|---|
| ISL | 4.98 | inch AFPL | 4.33 | inch |
| OSL | 2.97 | inch FSF | 1.18 | |
| CL | 4.68 | inch CSF | .60 | |
| WIDTH | 10.83 | inch SSI | 100.00 | % |
| GROSSAREA | 46.29 | inch^2CL/SH | .90 | |
| NETAREA | 46.20 | inch^2N/G | 1.00 | |

| Experimental | | | | |
|---|---|---|---|---|
| ISL | 3.64 | inch AFPL | 4.35 | inch |
| OSL | 4.52 | inch FSF | 1.13 | |
| CL | 4.62 | inch CSF | 1.24 | |
| WIDTH | 11.19 | inch SSI | 100.00 | % |
| GROSSAREA | 48.17 | inch^2CL/SH | .90 | |
| NETAREA | 47.92 | inch^2N/G | .99 | |

TABLE 4

Footprint Comparison (Right Hand Turn)
Dimensions/Ratio

| CONTROL | | | | |
|---|---|---|---|---|
| ISL | 3.02 | inch AFPL | 4.33 | inch |
| OSL | 5.02 | inch FSF | 1.16 | |
| CL | 4.65 | inch CSF | 1.66 | |
| WIDTH | 10.77 | inch SSI | 100.00 | % |
| GROSSAREA | 46.07 | inch^2CL/SH | .90 | |
| NETAREA | 44.02 | inch^2N/G | .96 | |

| Experimental | | | | |
|---|---|---|---|---|
| ISL | 3.16 | inch AFPL | 4.56 | inch |
| OSL | 5.14 | inch FSF | 1.20 | |
| CL | 4.97 | inch CSF | 1.62 | |
| WIDTH | 10.86 | inch SSI | 100.00 | % |
| GROSSAREA | 47.82 | inch^2CL/SH | .99 | |
| NETAREA | 46.22 | inch^2N/G | .97 | |

Table 5 provides data for track testing of the tires. Lap times for the experimental tires were significantly improved as compared to the control. Despite the increased speed, tread temperatures remained in a desirable range, and were more even across the tread face.

TABLE 5

Track Data

| Date: | Jul. 21, 2001 | Car: | Corvette |
|---|---|---|---|
| Weather: | Clear 75 F. | Fuel: | Standard Fuel Run |

| TIRES | Lap Times (seconds) | ΔTread Temperature (degrees F.) | | | | | | Comments |
|---|---|---|---|---|---|---|---|---|
| | | Left | | | Right | | | |
| Control (Front & Rear) | OUT 99.67 92.31 92.09 93.48 IN | −15 −15 | 0 0 | +25 −5 | +25 0 | 0 0 | −15 −25 | The track is very slippery, car has slight push turning right, experiencing abrupt turn-in with laziness at the rear. |

TABLE 5-continued

Track Data

| | | | | | | | | |
|---|---|---|---|---|---|---|---|---|
| Experimental | OUT | −15 | 0 | +25 | +20 | 0 | −5 | Stabilized the whole car. Power down seems |
| Rear | 94.73 | −5 | 0 | −5 | 0 | 0 | −5 | similar at first, instant control on out lap. At |
| (Control | 91.81 | | | | | | | speed the car stays flatter. Old tire sways (flops) |
| Front) | 91.26 | | | | | | | at the rear when you get to the limit. No |
| | 93.06 | | | | | | | response lag at turn-in, you can get into the |
| | IN | | | | | | | trottle immediately. |

EXAMPLE 2

The invention concept has been tried on tires used on Sprint cars (World of Outlaws) used for dirt racing, and for tires used in stock car racing (NASCAR). Tires used in each series were made using the following parameters. The NASCAR information shows only the predicted values obtained using the method of the invention since tires made by the method have not yet been tested.

| | World of Outlaws SPRINT CAR Dirt RF-T | NASCAR Stock RS-T |
|---|---|---|
| L | 5.20 | N/A |
| P | 0.20 | N/A |
| K | 657 | 3500 |
| S | 7.0 | 6.1 |
| W | 20.0 | 11.2 |
| C | 2.0 | 3.00 |
| N | 300 | 900 |
| sinC | 0.03 | 0.05 |
| L(calc) | 7.93 | 3.71 |
| P(calc) | .24 | .33 |

While certain representative embodiments and details have been shown for the purpose of illustrating the subject invention, it will be apparent to those skilled in the art that various changes and modifications can be made therein without departing from the scope of the subject invention.

What is claimed is:

1. In a method of forming a pneumatic radial tire, a tire having a pair of annular beads or bead-like structures in association with a carcass ply, belt or breaker reinforcement disposed over a crown area of said carcass ply, tread disposed over said belt or breaker, and sidewalls disposed between said tread and said beads or bead-like structures, wherein the tread has an asymmetric profile having a peak spaced from the tread centerline, the improvement comprising determining a height P and location L of a peak using the formulas $P = (\sin C \cdot W) - (N/K)$ and $L = \frac{1}{2}W - (0.3P/\sin C)$, wherein L is the distance in inches of Peak shift from the centerline, P is the maximum differential in inches in mold geometry from side to side, K is tire vertical spring rate, lbs/in, S is sidewall length, inches, W is tread width, inches, C is the average dynamic camber, degrees, and N is the normal load lbs; and forming said pneumatic radial tire with said peak having said height P and location L.

2. The method of forming a pneumatic radial tire of claim 1 wherein the highest point in the tread is located 3 inches (7.62 cm) from said centerline (CL).

3. The method of forming a pneumatic radial tire of claim 1 wherein the tread at its highest point is 0.127 to 5 cm higher than the tread at a corresponding point in a tread half on an opposed side of said centerline (CL).

4. The method of forming a pneumatic radial tire of claim 1 wherein the highest point in said tread is 0.127 to 1.27 cm higher than a corresponding point in a tread half on an opposed side of said centerline (CL).

* * * * *